United States Patent [19]

Sawyer

[11] 4,160,674
[45] Jul. 10, 1979

[54] EARLY HIGH-STRENGTH PORTLAND CEMENT AND METHOD OF MANUFACTURE

[75] Inventor: James L. Sawyer, Friendswood, Tex.

[73] Assignee: Lone Star Industries, Houston, Tex.

[21] Appl. No.: 873,308

[22] Filed: Jan. 30, 1978

[51] Int. Cl.$^2$ .............................................. C04B 7/02
[52] U.S. Cl. ...................................... 106/89; 106/102
[58] Field of Search ................................... 106/102, 89

[56] References Cited

U.S. PATENT DOCUMENTS

| | | | |
|---|---|---|---|
| 1,737,904 | 12/1929 | Witte | 106/102 |
| 2,006,386 | 7/1935 | Durbin et al. | 106/102 |
| 2,042,833 | 6/1936 | Durbin | 106/102 |
| 3,305,375 | 2/1967 | Jakacki | 106/110 |
| 3,689,294 | 9/1972 | Brunauer | 106/102 |

*Primary Examiner*—James Poer
*Attorney, Agent, or Firm*—Fulbright & Jaworski

[57] ABSTRACT

A cement with rapid strength gain having normal setting and volume change characteristics and its method of manufacture are disclosed. The cement has substantially all particles over 20 microns removed which advantageously results in higher early strength than normal portland cements. This is important in the prestress and precast concrete industry, and early high-strength cement is desirable for other uses such as patching or resurfacing highways and airport runways or in operations where early form removal is desired. The use of chlorides or other accelerators is unnecessary to obtain early high strengths; although, these and plasticizers can be used if desired.

12 Claims, 2 Drawing Figures

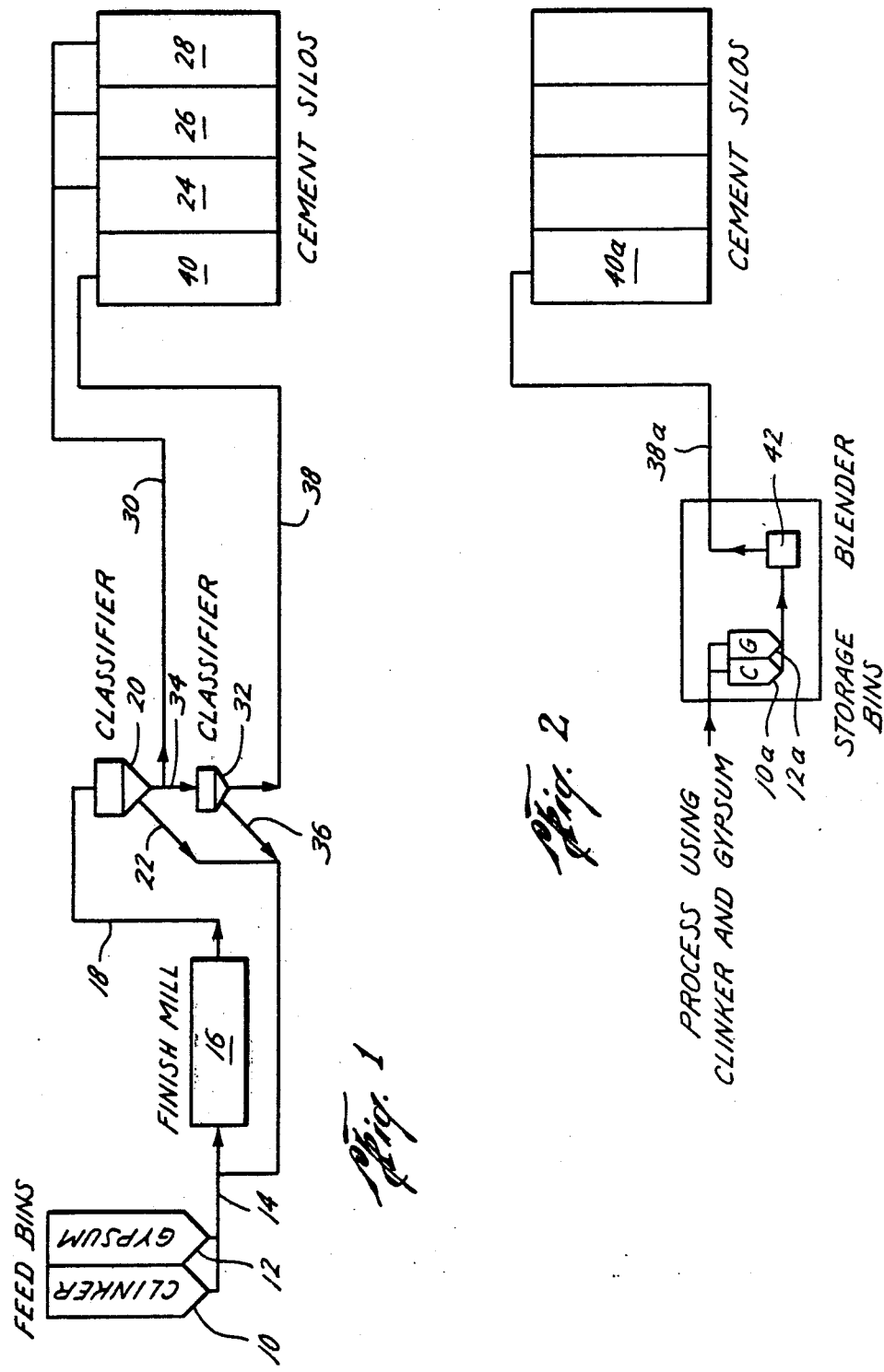

EARLY HIGH-STRENGTH PORTLAND CEMENT AND METHOD OF MANUFACTURE

BACKGROUND OF THE INVENTION

There is a need for a cement which has the setting and volume change characteristics normal for portland cements but which has early very high compressive strengths. This need is particularly acute for portland cements used in the prestress and precast concrete industry. Considerable savings result from the required strength being obtained at early ages so that construction can continue and there is a more rapid reuse of molds. There is also a need for such a very early high-strength cement having the setting characteristics of portland cement in patching or resurfacing highways and airport runways or in any operation where early form removal is desired.

While there have been proposals in the past for a cement having early high compressive strength, none of them have had the early compressive strengths required without the use of chlorides or other accelerators.

The following United States of America patents are directed to manufacture of cement involving separation of cement particles as well as various separation processes directed to various materials: 1,592,343; 1,943,817; 2,214,715; 2,214,716; 2,288,179; 2,424,746; 3,013,786; and 3,638,400.

Of the foregoing patents, Downes (U.S. Pat. No. 2,424,746) discloses a process of manufacture of cement in which cement is carried through a centrifugal separation process to separate cement particles of a size smaller than 100-mesh while those of a larger size are recycled to the tube mill.

The patent to Pyzel (U.S. Pat. No. 3,013,786) is directed to a hydraulic cement process in which the cement is subjected to a separating step in which particles of 200 micron sizes are separated from particles of smaller size.

The patent of Heilmann (U.S. Pat. No. 3,638,400) refers to a separation of alkali-rich dust having a particle size larger than 5 to 15 microns from cement by electrostatic techniques for the purpose of controlling the alkali content of cement clinker.

The remaining patents are generally directed to separations of finer particles from coarse ones by various techniques.

None of the foregoing patents, however, discloses or suggests a cement having substantially all of its particles of about 20 microns and smaller by which unexpected and highly advantageous early high-strength properties are obtained; that is, cement having a compressive strength better than 1,000 psi by 6 hours and 6,000 psi by 24 hours when tested in a standard 1 to 2.75 by weight cement-sand mortar, having the setting and volume change characteristics that are normal for and are typical of portland cement, and having longer plasticity than standard portland cement.

SUMMARY

It would be highly advantageous and the present invention is directed to a cement, and its method of manufacture, which has very early high compressive strength, that is, compressive strength better than 1,000 psi by 6 hours and 6,000 psi by 24 hours when tested in a standard 1 to 2.75 by weight cement-sand mortar without the use of chlorides or other accelerators, which has the setting and volume change characteristics that are normal and typical of portland cement yet has longer plasticity so that it can be worked longer than normal portland cement. If desired, however, accelerators and plasticizers can be added to improve plasticity and further improve early strength.

This early high-strength cement can be obtained by diverting all or a part of the normal cement production to a classifier capable of making a precise sharp cut in small micron sizes and removing particles over 20 microns. Alternatively, the clinker and gypsum can be ground to 20 microns separately, then recombined in the desired proportions. The feed for the classifier can be either the normal output of a plant separator or a cement from storage.

Additional details of both the cement and process of its manufacture are set forth in the description of the preferred embodiments.

Accordingly, it is an object of the present invention to provide a cement having a very early high compressive strength having the setting and volume change characteristics that are normal for and typical of portland cement yet having longer plasticity.

A further object of the present invention is the provision of such a very early high compressive strength cement without the use of chlorides or other accelerators.

A further object of the present invention is the provision of a cement having substantially all of its particles of about 20 microns and smaller.

A further object of the present invention is the provision of a cement having early high compressive strength better than normal portland cement without the use of chlorides or other accelerators, although these can be used for added strength and plasticity when desired.

A further object of the present invention is the provision of a cement having compressive strength better than 1000 psi by 6 hours and 6000 psi by 24 hours when tested in a standard 1 to 2.75 by weight cement-sand mortar and having setting and volume change characteristics that are normal for and typical of portland cements.

A further object of the present invention is the provision of inexpensive methods of manufacturing such cement from either a standard cement feed or by blending preground clinker and gypsum.

A further object of the invention is the provision of methods of manufacture of such an early high-strength cement with a minimum change in current manufacturing processes for standard portland cement.

A further object of the present invention is the provision of a process for manufacturing such a cement which is economical and readily performed by available equipment.

Other and further objects, features and advantages of the very early high-strength cement and its method of manufacture appear throughout.

BRIEF DESCRIPTION OF THE DRAWING

FIG. 1 is a flow diagram illustrating a process of manufacture of the very early high-strength cement.

FIG. 2 is a flow diagram illustrating an alternate process for producing the cement using clinker and gypsum.

DESCRIPTION OF THE PREFERRED EMBODIMENTS

The cement of the invention comprises an early high compressive strength cement having substantially all of its particles of 20 microns and smaller and which has the setting and volume change characteristics normal for and typical of portland cement. This is accomplished by removing coarse particles, that is, particles greater than about 20 microns, and, as described in more detail later, the cement can be produced simply by removing substantially all particles of a size greater than 20 microns, all or a portion of the removed particles can be reground to a size of 20 microns and smaller or clinker and gypsum can be ground and classified separately to 20 micron size and smaller and then combined in the desired proportions.

TABLE 1

| Test Method | Percentage Less Than Stated Size | | | |
|---|---|---|---|---|
| | 5 Microns | 10 Microns | 15 Microns | 20 Microns |
| Wagner (Modified) | 55% | 84% | 100% | 100% |
| Coulter | 55% | 92% | 99% | 100% |
| L & N Microtrac | 47% | 75% | 88% | 93% |
| Millipore | 30% | 64% | 87% | 93% |

From the foregoing Table 1 it is seen that the percentage of particles in the various micron sizes given vary considerably. Accordingly, the phrase, "substantially all of its particles of a size of about 20 microns and smaller," would include percentages down to 93% as set forth in this table and could vary even more depending upon the particular test method used in determining particle size as well as manufacturing tolerances. It is only necessary that most of the particles be of 20 microns and smaller in order to obtain the advantageous results of the present invention.

The test methods set forth in Table 1 are all standard tests, are known to and used by those skilled in the art to which this invention pertains, and, accordingly, no detailed description thereof is deemed necessary or given.

As set forth later herein, this cement with essentially all of the +20 micron material removed has a compressive strength better than 1,000 psi by 6 hours and 6,000 psi by 24 hours when tested in a standard 1 to 2.75 by weight cement-sand mortar.

While chlorides or other accelerators and functional addition or water-reducing mixtures are unnecessary, these can be added for achieving improved plasticity and increased strength.

The functional addition of water-reducing mixtures and other plasticizers can be added in amounts of 0.9% to about 1.8%. While any desired plasticizer can be used, those plasticizers available and particularly suited for use with the cement include sulfonated naphthalene formaldehyde condensates and sulfonated melamine formaldehyde condensates, which are available in the trade and sold under the marks of Mighty-100, Mighty 150 or Melment.

The present invention is applicable to all cement having the setting and volume change characteristics normal for and typical of portland cement. These include, of course, all portland cements; however, Type III (normal) portland cement is preferred since it yields more particles of 20 microns or smaller than Types I and II.

Advantageously, a cement according to the present invention can be made from portland type cement, and preferably a normal Type III (ASTM) cement as a feed and the coarse particles removed from either ground clinker or cement. The coarse particles can be reground and blended in with the particles of 20 microns and under or can be used separately or combined with other cements. Alternatively, the clinker and gypsum can be ground separately then recombined in the desired proportions.

The following Table 2 indicates the amount of fine particles in the Type III feed, the fine product (20 microns and smaller) and the coarse reject.

TABLE 2

Amount of Fine Particles in Type III Feed, Fine Product and Coarse Rejects

| | Percentage Less than Stated Size | | | |
|---|---|---|---|---|
| | 5 Microns | 10 Microns | 15 Microns | 20 Microns |
| ASTM Type III, Feed | 16% | 40% | 52% | 65% |
| Fine Product | 30% | 64% | 87% | 93% |
| Coarse Rejects | 3% | 7% | 12% | 24% |

From the above table it is seen that in the normal ASTM Type III Feed there is a maximum of about 65% particles of 20 micron size and under; whereas, in the fine product there are up to and including 93% 20 micron sized particles and smaller.

The composition of a Type III portland cement having substantially all its particles of a size of up to and including 20 microns (fine product) is set forth in the following Table 3.

TABLE 3

| Chemical Analysis-Fine Product | | Compound Composition | |
|---|---|---|---|
| $SiO_2$ | 19.61 | $C_3S$ | 46.58 |
| $Al_2O_3$ | 4.93 | $C_2S$ | 21.10 |
| $Fe_2O_3$ | 2.50 | $C_3A$ | 8.83 |
| CaO | 61.26 | $C_4AF$ | 7.61 |
| MgO | 1.42 | $CaSO_4$ | 10.18 |
| $SO_3$ | 5.99 | | |
| Loss | 3.12 | | |
| Total | 98.83 | | |
| Lime Factor | 2.45 | | |
| Silica Ratio | 2.64 | | |
| A/F | 1.97 | | |
| Insol Residue | 0.53 | | |
| Free CaO | 1.26 | | |
| $Na_2O$ | 0.11 | | |
| $K_2O$ | 1.06 | | |
| Total Alk. | 0.81 | | |

The following Table 4 sets forth miscellaneous tests on a Type III portland cement having substantially all of its particles of about 20 microns and under (fine product).

TABLE 4

| Miscellaneous Tests on Fine Product | |
|---|---|
| Compound Composition by X-Ray Diffraction | |
| $C_3S$ | 47% |
| $C_2S$ | 22% |
| $C_3A$ | 7.5% |
| $C_4AF$ | 7.2% |
| Condition of $SO_3$ by Differential Thermal Analyzer | |
| 0.00% | $SO_3$ as Gypsum |
| 2.07% | $SO_3$ as Plaster of Paris |
| 3.92% | $SO_3$ as Anhydrite |
| Thermal Gravimetric Analysis | |
| 1.27% | $Ca[OH]_2$ |
| 4.39% | $CaCO_3$ |
| Heat of Hydration | |
| 113.7 cal/gram at 7 days | |
| 114.8 cal/gram at 28 days | |
| Conduction Calorimeter | |
| Initial Peak | 3.6 min. |
| cal/gm/.01 hr. | .246 |
| Second Peak | 4.15 hrs. |

TABLE 4-continued

| | cal/gm/hr. | | 9.96 | |
|---|---|---|---|---|
| Total Heat Through: | 2 hrs. | 1 day | 2 days | 3 days |
| Cal/gm | 2.98 | 67.97 | 73.37 | 75.16 |

The following Table 5 compares the fine product (20 micron amd smaller size particles) with and without a functional addition, Mighty 150 plasticizer.

TABLE 5

| Fine Product with and without Functional Addition | | | |
|---|---|---|---|
| | No Addition | 0.9% Addition | 1.8% Addition |
| W/C[1] Ratio | 0.485 | 0.456 | 0.399 |
| Compressive Strength, 2" Cubes, psi. (ASTM C109) | | | |
| 1 day | 6700 | 7610 | 8740 |
| 3 days | 8420 | 8880 | 10080 |
| 7 days | 9330 | 9350 | 10550 |
| 28 days | 9820 | 9450 | 12100 |
| N.C.[2](ASTM C187) | 37.4 | 30.4 | 28.0 |
| Gillmore Set[3] (ASTM C266) | | | |
| Initial | 2:00 | 2:45 | 2:05 |
| Final | 3:30 | 4:10 | 3:00 |
| Vicat Set[3] (ASTM C191) | | | |
| Initial | 90 min. | 100 min. | 80 min. |
| Final | 130 min. | 165 min. | 115 min. |
| Auto Exp.[4] (ASTM C151) | −.005% | −.004% | −.015% |
| Air[5] (ASTM C185) | 12.5% | 17.8% | 18.5% |
| Opt. SO$_3$ by Strength[6] (ASTM C563) | 5.99% | above optimum | — |
| Calcium Sulfate[6] in Hydrated Mortar | 0.19 g/l | 0.13 g/l | — |

[1]Water cement
[2]Normal consistency
[3]Setting Test Methods
[4]Autoclave Expansion
[5]Percent entrained air
[6]Set-Control Addition All of the tests were made by standard ASTM tests as set forth in Table 5. This table shows the remarkably very high strength of the fine cement both with and without plasticizers.

The following Table 6 illustrates the effect of curing temperature conditions on the fine cement (substantially all particles 20 microns and smaller).

TABLE 6

| Effect of Curing Conditions of Fine Product | | | | |
|---|---|---|---|---|
| | No Addition | | | |
| | 73° F. | 50° F. | 95° F. | Steam (150° F.) |
| W/C[1] | 0.485 | 0.485 | .485 | 0.485 |
| Compressive Strength, 2" Cubes, 1:2.75 | | | | |
| 4 hrs. | — | — | — | 3030 |
| 6 hrs. | 1450 | — | 3850 | 5680 |
| 18 hrs. | 5850 | — | 6380 | 6820 |
| 1 day | 6700 | 4440 | 6970 | 8150 |
| 3 days | 8420 | 5130 | 7700 | 8240 |
| 7 days | 9330 | 8350 | 8520 | 8620 |
| 28 days | 9820 | 9410 | 9560 | 9720 |

Note that at a temperature of 73° F. that the fine cement without a plasticizer had a compressive strength of 1450 psi in 6 hours and in one day had a compressive strength of 6700 psi.

The following Table 7 provides the results of various physical tests including compressive strength and the plasticity. The Type III Feed is the ASTM Type III portland cement, the coarse rejects are over 20 microns in particle size, and the fine product is the cement in which substantially all of the particles above 20 micron size have been removed.

TABLE 7

| | Physical Tests | | |
|---|---|---|---|
| | Type III Feed | Coarse Rejects | Fine Product |
| 325 (ASTM C430) | 95.0 | 93.7 | 99.6 |
| Wagner (ASTM C115) | 2520 | 1470 | 4370 |
| Blaine (ASTM C204) | 5560 | 1780 | 8990 |
| Density (ASTM C188) | 3.15 | 3.19 | 3.00 |
| W/C[1] Ratio | .485 | .485 | .485 |
| Flow (ASTM C109) | 108 | 120 | 64 |
| Compressive Strength, 2" Cubes, psi (ASTM C109) | | | |
| 1 day | 3530 | 1150 | 6700 |
| 3 days | 5500 | 2320 | 8420 |
| 7 days | 6920 | 3360 | 9330 |
| 28 days | 7550 | 5000 | 9820 |
| N.C.[2](ASTM C187) | 26.6 | 24.6 | 37.4 |
| Exp.[3] (ASTM C151) | −.004 | .002 | −.005% |
| Air[4] (ASTM C185) | 9.6 | 8.4 | 12.5% |
| Gillmore Set[5] (ASTM C266) | | | |
| Initial | 1:20. | 3:05 | 2:00 |
| Final | 2:40 | 4:35 | 3:30 |
| Vicat Set[5] (ASTM C191) | | | |
| Initial | 80 min. | 185 min. | 90 min. |
| Final | 115 min. | 230 min. | 130 min. |

[1]Water-cement ratio
[2]Normal consistency
[3]Autoclave expansion
[4]Percent entrained air
[5]Setting Test Methods Again, this table illustrates the very high early strength of the fine product as compared to the standard Type III feed and coarse rejects. The fine product is almost twice as strong in one day as a Type III feed and almost 6 times as strong as the coarse rejects. Also note from the table that surprisingly the fine product has a higher plasticity than the normal Type III portland cement, which of course means that it is workable longer than the Type III portland cement. Again, all tests are standard ASTM tests as indicated in the table.

The following Table 8 includes data from standard ASTM shrinkage and expansion tests for both the standard Type III portland cement and one that has substantially all of its particles of 20 microns and smaller (fine product):

TABLE 8

| | Volume Change Tests | | | | | |
|---|---|---|---|---|---|---|
| | Drying Shrinkage-(ASTM C596) | | | Expansion in Water(ASTM C157) | | |
| | 1:2 Mortar, 1 × 1 × 10" Bars | | | 1:2.75 Mortar, 1 × 1 × 10" Bars | | |
| Cement | Type III Feed | Fine Product | | Type III Feed | Fine Product | |
| Functional Addition | None | None | 0.9% | None | None | 0.9% |
| W/C[1] | 0.360 | 0.507 | 0.363 | 0.485 | 0.485 | 0.456 |
| Age | Contraction, % | | | Expansion, % | | |
| 3 days | — | — | — | .002 | .005 | .008 |
| 7 days | .050 | .067 | .065 | .004 | .007 | .009 |
| 14 days | .064 | .083 | .088 | .004 | .009 | .011 |
| 21 days | .081 | .088 | .094 | .006 | .009 | .012 |
| 28 days | .092 | .093 | .099 | .006 | .011 | .013 |

[1]Water-Cement Ratio

The functional addition in this test was the same as in Table 5. The foregoing data demonstrates the similarity in the shrinkage and expansion characteristics of the standard Type III normal portland cement and one which has substantially all of its particles of 20 microns and smaller in size.

The data in the following Table 9 illustrates the effect of classification size using a clinker as feed in which gypsum was blended with the classified clinker to give 4.20% by weight $SO_3$ as tested.

TABLE 9

Effect of Classification Size Using Clinker as Feed Using 0.9% Functional Addition and W/C Ratio of 0.405

| | -60M Clinker Feed | -25M Product | -20M Product | -15M Product | -10M Product |
|---|---|---|---|---|---|
| | Compressive Strength, 2" Cubes, psi (ASTM C109) | | | | |
| 6 hours | 100 | 190 | 800 | 1550 | 2500 |
| 1 day | 3500 | 5500 | 6400 | 7500 | 8000 |
| 3 days | 5800 | 7300 | 7600 | 8600 | 8700 |
| 7 days | 9100 | 9200 | 9200 | 9300 | 9300 |
| 28 days | 9800 | 12000 | 11600 | 10800 | 10800 |

Here again, a clinker blended with gypsum having particle size up to 20 microns and smaller has very early high compressive strength, particularly when contrasted to the same product having particle size up to and including 25 microns.

The following Table 10 illustrates the effect of the classification size using the standard Type III portland cement as feed.

TABLE 10

Effect of Classification Size Using Cement as Feed
No Addition

| | Type III Feed | -35M Product | -25M Product | -20M Product | -15M Product |
|---|---|---|---|---|---|
| W/C Ratio | .485 | .485 | .485 | .485 | .485 |
| | Compressive Strength, 2" Cubes, psi (ASTM C109) | | | | |
| 6 hours | 250 | 350 | 600 | 1450 | 1850 |
| 1 day | 3500 | 4900 | 5900 | 6700 | 7100 |
| 3 days | 5500 | 6600 | 7400 | 8400 | 8400 |
| 7 days | 6900 | 8100 | 8300 | 9300 | 9200 |
| 28 days | 7600 | 9200 | 9300 | 9800 | 9900 |

1.8% Functional Addition

| Type III | -35M | -25M | -20M | -15M |
|---|---|---|---|---|

TABLE 10-continued

| | Feed | Product | Product | Product | Product |
|---|---|---|---|---|---|
| W/C Ratio | .405 | .405 | .405 | .405 | .405 |
| | Compressive Strength, 2" Cubes, psi. (ASTM) | | | | |
| 6 hours | Soft | 350 | 990 | 1100 | 1050 |
| 1 day | 4700 | 6500 | 7300 | 8500 | 8600 |
| 3 days | 6600 | 7700 | 8700 | 9700 | 10200 |
| 7 days | 8100 | 9100 | 9600 | 10500 | 11200 |
| 28 days | 9400 | 10000 | 10800 | 11600 | 12200 |

As in the classified clinker and gypsum illustrated in Table 9, there is an unexpected and substantial increase in compressive strength from a portland cement having its particle size as 25 microns and less with the same product having particle sizes of 20 microns and less. Note, however, that the use of 1.8% functional addition, which is the same plasticizer used in Example 5, there is an increase in the compressive strength of all these cements, although some retardation was observed at 6 hours.

As previously mentioned, other type portland cement or cement having setting and volume change characteristics normal for and typical of portland cement can be substituted for the Type III (ASTMS) portland cement in the above examples and tables with comparable results.

The method of this invention by which the cement is made is best illustrated in connection with the figures of the drawing. Referring first to FIG. 1, clinker and gypsum in the feed bins 10 and 12, respectively, are passed in the desired proportions in line 14 to the finish mill 16. The mill cement is then passed by line 18 into a first classifier 20, for example an air separator which separates out the very coarse particles from particles which normally make up a normal portland cement. The coarse particles are returned by means of the flow line 22 to the input line 14 to the finish mill 16 for further grinding. If desired, the particles from the classifier 20 may be transferred to the cement silos 24, 26 and 28 by means of the flow line 30 to provide a standard portland cement.

To obtain a cement having substantially all of its particles of about 20 microns and smaller, the particles from the classifier 20 are transferred to the classifier 32 by means of the line 34. The classifier 32 is a centrifugal, fine particle classifier that disburses and then classifies the particles into coarse and fine fractions of 20 microns and smaller. The classifier should be capable of making a precise, sharp cut at small micron sizes, such as 20 microns. An Acucut classifier, which is readily available on the market, is satisfactory. Also, the classifier 20 can be an air separator commonly used in the manufacture of cement. Accordingly, no detailed description of the classifiers 20 and 32 is given or deemed necessary.

The coarse particles, that is, the particles over 20 microns in size, are rejected and are returned to the input line by means of the flow line 36 which is connected into the flow line 22 so that the coarser particles can be ground again in the finish mill 16 and classified in the classifiers 20 and 32. The fine particles, that is, the particles of 20 micron size and smaller, are transferred by the flow line 38 to the cement silo 40.

FIG. 2 illustrates another embodiment of the invention in the method of making the cement in which the reference letter "a" has been added to reference numerals of FIG. 1 designating corresponding parts for convenience of reference.

In this embodiment, the clinker and gypsum are previously ground and classified to the particle size of 20 microns and smaller and are transferred from the bins 10a and 12a to a blender 42 which blends the clinker and gypsum in the desired proportions, for example gypsum blended with classified clinker to give 4.20% $SO_3$ by weight, and then transferred by means of a flow line 38a to the silo 40a.

While grinding the cement feed to 20 micron and smaller particle size provides an excellent end product, it is considerably more expensive at present than by grinding the cement of a Type III cement, removing the particles over 20 microns in size, and regrinding the removed particles as illustrated in the flow diagram of FIG. 1.

From the foregoing it is seen that a cement according to the invention and manufactured according to the invention has very high early strength which is very important for use in the prestress and precast concrete industry, and in patching or resurfacing highways and air port runways or any operation where early form removal is desired and in which the placing of the concrete interrupts construction on other operations. Surprisingly, a cement of particle size 20 microns and smaller unexpectedly and surprisingly has considerably higher early strength than a cement having a particle size of only 25 microns and under, yet a cement having a particle size of 20 microns and under has greater plasticity than the normal portland cement which procides a longer time for working the cement.

Accordingly, the present invention is well suited and adapted to obtain the objects and ends and has the advantages and features mentioned as well as others inherent therein.

The foregoing embodiments have been given for the purpose of disclosure and changes can be made therein which are within the spirit of the invention as defined by the scope of the appended claims.

What is claimed is:

1. An early high-strength cement having substantially all of its particles of a size of 20 microns and smaller, the cement having setting and volume change characteristics normal for and typical of portland cement.

2. The cement of claim 1 including,
a plasticizer.

3. The cement of claim 1 including,
an accelerator.

4. A method of producing an early high-strength cement having setting and volume change characterstics normal for and typical of portland cement comprising,
removing substantially all particles from a portland cement of a size greater than 20 microns.

5. The method of claim 4 including,
grinding at least some of the particles of cement of a size greater than 20 microns to a size of 20 microns and smaller and blending the latter with the cement particles.

6. The method of claim 4 including,
blending a plasticizer with the early high-strength cement.

7. The method of claim 4 including,
blending an accelerator with the early high-strength cement.

8. A method of producing an early high-strength cement having setting and volume change characteristics normal for and typical of portland cements comprising,
grinding a portland cement feed to particle sizes typical of an ASTM Type III portland cement, and
separating cement particles so that essentially all particles of a size greater than 20 microns are removed from the Type III feed.

9. The method of claim 8 including,
combining the separated particles with an regrinding them with the portland cement feed.

10. A method of producing an early high-strength cement having setting and volume change characteristics normal for and typical of portland cements comprising,
blending clinker and gypsum particles of a size of 20 microns and smaller to form the early high-strength cement.

11. The method of claim 10 including,
adding an accelerator to the early high-strength cement.

12. The method of claim 10 including,
adding a plasticizer to the early high-strength cement.

* * * * *

UNITED STATES PATENT OFFICE
CERTIFICATE OF CORRECTION

Patent No. 4,160,674          Dated   July 10, 1979

Inventor(s)   James L. Sawyer

It is certified that error appears in the above-identified patent and that said Letters Patent are hereby corrected as shown below:

Column 5, line 59, add "$^1$Water - cement ratio"

Column 9, line 33, change the word "of" to --to--.

Column 9, line 50, change the word "procides" to --provides--.

Signed and Sealed this

First Day of January 1980

[SEAL]

Attest:

SIDNEY A. DIAMOND

Attesting Officer          Commissioner of Patents and Trademarks